United States Patent [19]
Kiyose et al.

[11] Patent Number: 5,463,037
[45] Date of Patent: Oct. 31, 1995

[54] PROCESS FOR PRODUCING MIXED CELLULOSE ETHER

[75] Inventors: Atsunobu Kiyose, Hyogo, Japan; Yonosuke Kato, Singapore, Singapore

[73] Assignee: Daicel Chemical Industries, Ltd., Osaka, Japan

[21] Appl. No.: 252,537

[22] Filed: Jun. 1, 1994

Related U.S. Application Data

[63] Continuation of Ser. No. 967,385, Oct. 28, 1992, abandoned.

[30] Foreign Application Priority Data

Oct. 29, 1991 [JP] Japan ................... 3-282881

[51] Int. Cl.$^6$ .......................... C08B 11/193; C08B 11/20
[52] U.S. Cl. .................. 536/90; 536/91; 536/95; 536/96
[58] Field of Search ................. 536/84, 85, 90, 536/91, 95, 96

[56] References Cited

U.S. PATENT DOCUMENTS

| | | | |
|---|---|---|---|
| 4,013,821 | 3/1977 | Engelskirchen et al. ........... | 536/88 |
| 4,096,326 | 6/1978 | Reid ............................ | 536/95 |
| 4,523,010 | 6/1985 | Lukach et al. .................. | 536/91 |
| 4,579,942 | 4/1986 | Brode ........................... | 536/84 |
| 4,579,943 | 4/1986 | Kamide et al. .................. | 536/98 |
| 4,650,863 | 3/1987 | Felcht et al. .................. | 536/90 |

FOREIGN PATENT DOCUMENTS 0161607 11/1985 European Pat. Off. .
2265761 10/1975 France .

*Primary Examiner*—Nathan M. Nutter
*Attorney, Agent, or Firm*—Sughrue, Mion, Zinn, Macpeak & Seas

[57] ABSTRACT

A process for producing a mixed cellulose ether comprising reacting a starting cellulose ether with an etherifying agent is disclosed, wherein said starting cellulose ether comprises at least 18 mol % of a 6-substituted glucose unit and at least 15 mol % of an unsubstituted glucose unit. A high utilization of the etherfifying agent can be reached. The resulting mixed cellulose ether has a high solubility in water and an aqueous solution of the resulting mixed cellulose ether has excellent properties such as flow properties and clarity.

7 Claims, No Drawings

PROCESS FOR PRODUCING MIXED CELLULOSE ETHER

This is a continuation of application Ser. No. 07/967,385 filed Nov. 28, 1992 and now abandoned.

FIELD OF THE INVENTION

This invention relates to a process for producing a mixed cellulose ether having at least two substituents which is useful in various fields. More particularly, it relates to a process for economically and stably producing a mixed cellulose ether having a dihydroxyalkyl group as one of the two or more substituents thereof and exhibiting excellent properties.

BACKGROUND OF THE INVENTION

Cellulose ethers have been used in various fields. For example, carboxymethyl cellulose (CMC), hydroxyethyl cellulose (HEC) or hydroxypropyl cellulose (HPC) have been widely employed in the fields of cosmetics, foods, engineering, coatings, and pharmaceuticals. On the other hand, it has been studied to introduce an additional substituent to a cellulose ether to develop a mixed cellulose ether having two different substituents and exhibiting new functions. Several mixed cellulose ethers have so far been put to practical use. For example, carboxymethylhydroxyethyl cellulose (CMHEC), which has been developed for improving salt resistance of CMC by introduction of a hydroxyethyl group, is used in petroleum boring. Hydroxypropylmethyl cellulose (HPMC), i.e., methyl cellulose having introduced therein a hydroxypropyl group, has a property of changing its solubility depending on pH and finds its use as a coating material for enteric-coated tablets. Mixed cellulose ethers are thus widely employed, and a number of processes for production thereof have been proposed.

In general, processes for preparing cellulose ethers include a process using an epoxy-containing oxide, e.g., ethylene oxide or propylene oxide, or a chlorohydrin type etherifying agent to obtain a hydroxyalkyl ether; a process using a chlorinating agent, e.g., monochloroacetic acid or methylene chloride; and a process using dimethyl sulfate. The process for obtaining a mixed ether varies depending on the combination of substituents to be introduced.

Where introduction of two or more substituents can be effected in the same reaction system, necessary reaction reagents are added to the system simultaneously or successively. On the other hand, where two or more substituents must be introduced in the respective system, a product of first introduction is once isolated and purified and then treated for introduction of a second substituent. While there are many proposals made to date with respect to production of mixed cellulose ethers, any of them achieved no more than a halfway improvement by a delicate alteration of reaction conditions, giving no essential solution to the above-described problem.

For example, JP-A-50-130883 (the term "JP-A" as used herein means an "unexamined published Japanese patent application") proposes a process for producing a mixed cellulose ether having a dihydroxyalkyl group, in which an alkyl group or a hydroxyalkyl group is first introduced into cellulose to a degree of substitution of from 0.05 to 4.0 and the resulting cellulose ether is then reacted with, for example, glycidol to obtain a dihydroxypropyl-containing mixed cellulose ether. However, this process still needs further improvements in utilization of reagents and properties of an aqueous solution, such as clarity, of the resulting mixed ether.

SUMMARY OF THE INVENTION

An object of the present invention is to provide a process for producing a mixed cellulose ether with an increased utilization of an etherifying reagent.

Another object of the present invention is to provide a process for producing a mixed cellulose ether which has a high solubility in water and whose aqueous solution has improved properties such as flow properties and clarlity.

The inventors have investigated a process for producing mixed cellulose ethers comprising introducing a first substituent and then introducing a dihydroxyalkyl group and, as a result, found that the chemical structure of a cellulose ether obtained by introduction of a first substituent has great influences on the utilization of a reaction reagent for introduction of a second substituent and the properties of the resulting mixed cellulose ether such as solubility in water, which relates to flow properties and clarity of the aqueous solution. The present invention has been completed based on this finding.

The present invention relates to a process for producing a mixed cellulose ether comprising reacting a starting cellulose ether containing a first substituent with an etherifying agent either successively or continuously, wherein the starting cellulose ether comprises at least 18 mol % of a 6-substituted glucose unit and at least 15 mol % of an unsubstituted glucose unit. The content of the 6-substituted glucose is preferably from 18 to 50 mol % and more preferably from 18 to 35 mol % and the content of the unsubstituted glucose unit is preferably from 15 to 40 mol % and more preferably from 15 to 35 mol %.

The mixed cellulose ethers prepared according to the present inventon can be widely employed in various fields, for example, as a dispersion stabilizer in the fields of coatings, cosmetics and engineering, and as a controlled release agent or a humectant in the fields of medical cosmetics making use of the gelation properties.

DETAILED DESCRIPTION OF THE INVENTION

The first substituent present in the starting cellulose ether is not particularly limited. Examples of suitable starting cellulose ethers include a hydroxyalkyl cellulose, e.g., hydroxyethyl cellulose or hydroxypropyl cellulose; a carboxyalkyl cellulose, e.g., carboxymethyl cellulose; an alkyl cellulose, e.g., methyl cellulose or ethyl cellulose; and a cationic hydroxyalkyl cellulose. A hydroxyalkyl cellulose is preferred for obtaining particularly outstanding effects of the present invention.

The polymerization degree of the starting cellulose ether to be used in the present invention is generally from 100 to 10,000.

The terminology "6-substituted glucose unit" as used herein means an anhydrous glucose unit of cellulose having a substituent only at the 6-position thereof.

It is necessary that the starting cellulose ether having a first substituent should comprise at least 18 mol % of a 6-substituted glucose unit and at least 15 mol % of an unsubstituted glucose unit. Such a specific cellulose ether can be obtained by etherification in an increased alkali concentration, for a reduced mercerization time, and at an increased etherification temperature. More specifically, the alkali concentration in the aqueous phase is generally from 25% to 50% by weight and more preferably from 30% to 35% by weight, and the mercerization is carried out preferably for from 30 minutes to 4 hours, and more preferably from 30 minutes to 2 hours. Examples of the alkali include alkali metal hydroxides such as sodium hydroxide and potassium hydroxide.

The subsequent etherification reaction is conducted preferably at a temperature of 50° C. or higher for a period of 150 minutes at the longest. While the upper limit of the temperature of the etherification depends on the boiling temperature of reaction solvents or reagents to be used, in the case of using an alcoholic slovent which is generally used in the present invention, the upper limit of the temperature is approximately from 70° to 80° C. The lower limit of the time for the etherification depends on reagents to be used or performance of objective products, but the lower limit is geneally about 30 minutes. In the case of hydroxyalkylation, the concentration of the alkali is preferably from 30 to 35% by weight, the mercerization time is generally from 30 minutes to 120 minutes and preferably from 30 to 60 minutes, and the etherification is conducted at a possible high temperature, preferably from 50° to 80° C., for 1 to 2 hours.

The cellulose ether obtained under the above-described conditions has a chemical structure in which the substituent is distributed non-uniformly. It is unsuitable for general purposes but very favorable as a starting compound for preparing the mixed cellulose ether of the present invention.

The process for introducing a second substituent, a dihydroxyalkyl group, into the starting cellulose ether is not limited, but special care should be taken in distribution of an alkali. That is, it is desired to conduct the second etherification in the presence of an alkali in an amount of not more than 0.5 mol, more preferably from 0.1 to 0.4 mol, per mol of glucose unit. Examples of the alkali include alkali metal hydroxides such as sodium hydroxide and potassium hydroxide. If the reaction is conducted at a high temperature at too a high alkali concentration, the dihydroxyalkyl group would form not only a chain but a network structure only to produce a mixed cellulose ether having seriously reduced solubility in water, etc.

Suitable dihydroxyalkylating agent to be used in the second etherification includes glycidyl type compounds such as glycidol and halohydrin type compounds such as 1-chloro-2,3-dihydroxypropane.

The present invention is now illustrated in greater detail with reference to Examples, but it should be understood that the present invention is not construed as being limited thereto. All the percents are given by weight unless otherwise indicated.

The substituent distribution of the cellulose ethers prepared in Examples was determined as follows. A cellulose ether was hydrolyzed with 72% sulfuric acid, and the hydrolyzate was reduced with sodium borohydride to open the glucose ring. In the case of alkyl ethers, the product as obtained was purified and subjected to gas chromatography. In the case of hydroxyalkyl ethers, the product is treated with sodium hydride to activate the hydroxyl groups and then methylated with methyl iodide, and the resulting product is subjected to gas chromatography.

Measurement of Clarity

A sample solution is put into an outer tube, and the outer tube containing the sample solution is placed on a white paper on which 15 black lines each having a width of 1 mm are drawn in parallel such that the space between the lines being next to each other is 1 mm. When a person peeps into the sample solution through an inner tube from the upper position, the height from the bottom of the inner tube when it comes to be impossible to distinguish the lines by moving the inner tube up an down is measured. The outer tube is composed of a glass Cylinder having a height of 350 mm, an inner diameter of 25 mm and a thickness of 2 mm and a good quality glass plate having a thickness of 2 mm joined to the bottom of the glass cylinder, and the inner tube is composed of a glass cylinder having a height of 300 mm, an inner diameter of 15 mm and a thickness of 2 mm and a good quality glass plate having a thickness of 2 mm joined to the bottom of the glass cylinder.

Clarity (mm) as used hereinafter means an average of the values obtained by repeating the procedure three times.

The clarity of the resulting aqueous cellulose ether solutions measured in the following examples can be considered as an index of solubility in water of the resulting cellulose ethers.

EXAMPLE 1

Linters weighing 20 g having been ground in a cutting mill were put in a separable flask, and 253 g of t-butyl alcohol and 14.5 g of water were added thereto to make a slurry. A solution of 6.9 g of sodium hydroxide in 20 g of water was added to the slurry with stirring, and the stirring was continued for 2 hours for mercerization. After completion of the mercerization, 2.9 mols of ethylene oxide was added thereto per mol of anhydrous glucose unit, and the mixture was allowed to react at 60° C. for 1 hour and then at 75° C. for 1 hour. The resulting hydroxyethyl cellulose had a degree of hydroxyethyl substitution of 1.74 and contained 23.1 mol % of a 6-substituted glucose unit and 31.4 mol % of an unsubstituted glucose unit. A 1% aqueous solution of the product had a viscosity of 6000 cps (measured at 25° C. and 30 rpm, hereinafter the same) and a clarity of 30 mm, showing very poor solubility.

The thus obtained hydroxyethyl cellulose was etherified with 2.0 mols of chloropropanediol per mol of anhydrous glucose unit at a 27% alkali concentration of the water phase using sodium hydroxide. The resulting dihydroxypropylhydroxyethyl cellulose had a degree of dihydroxypropyl substitution of 1.20. A 1% aqueous solution thereof had a viscosity of 3500 cps and a clarity of 300 mm or more. The utilization of the etherifying reagent was 60%.

COMPARATIVE EXAMPLE 1

A commercially available hydroxyethyl cellulose (HEC) was analyzed to find that the degree of hydroxyethyl substitution was 2.32, the unsubstituted glucose unit content was 7.2 mol %, and the 6-substituted glucose unit content was 17.5 mol % and that a 1% aqueous solution thereof had a viscosity of 5000 cps and a clarity of 600 mm or more.

HEC was dihydroxypropylated in the same manner as in Example 1. The resulting mixed cellulose ether was found to have a degree of dihydroxypropyl substitution of 0.72, and its 1% aqueous solution had a viscosity of 180 cps and a clarity of 55 mm. The utilization of the etherifying reagent was 36%.

EXAMPLE 2

Linters weighing 20 g having been ground in a cutting mill were dispersed in 256 g of t-butyl alcohol and 12 g of water to make a slurry. A solution of 6.9 g of sodium hydroxide in 20 g of water was added to the slurry with stirring, and the stirring was continued for 1 hour for mercerization. After completion of the mercerization, 2.1 mols of ethylene oxide was added thereto per mol of anhydrous glucose unit, and the mixture was allowed to react at 70° C. for 2 hours. The resulting hydroxyethyl cellulose had a degree of hydroxyethyl substitution of 1.30 and a 6-substituted glucose unit content of 33 mol %, and an unsubstituted glucose unit content of 32 mol %. A 1% aqueous solution of the product had a viscosity of 630 cps. The clarity of the aqueous solution was too poor to measure.

The thus obtained hydroxyethyl cellulose was etherified with 2.0 mols of chloropropanediol per mol of anhydrous glucose unit at a 27% alkali concentration of the water phase using sodium hydroxide. The resulting dihydroxypropylhydroxyethyl cellulose had a degree of dihydroxypropyl substitution of 1.12. A 1% aqueous solution thereof had a viscosity of 3000 cps and a clarity of 300 mm or more. The utilization of the etherifying reagent was 56%.

COMPARATIVE EXAMPLE 2

Linters ground in the same manner as in Example 1 were reacted with 3.14 mols of ethylene oxide per mol of anhydrous glucose unit in the similar reaction system as in Example 1 at 60° C. for 80 minutes and then at 70° C. for 90 minutes.

The resulting hydroxyethyl cellulose had a degree of hydroxyethyl substitution of 2.20, a 6-substituted glucose unit content of 16 mol %, and an unsubstituted glucose unit content of 14 mol %. A 1% aqueous solution thereof had a viscosity of 4500 cps.

The thus obtained hydroxyethyl cellulose was dihydroxypropylated in the same manner as in Example 2. The resulting dihydroxypropylhydroxyethyl cellulose had a degree of dihydroxypropyl substitution of 0.76. A 1% aqueous solution thereof had a viscosity of 3540 cps and a clarity of 300 mm or more. The utilization of the etherifying reagent was 38%.

As described and demonstrated above, to start with a cellulose ether having a specific distribution of a first substituent makes it possible to introduce a dihydroxyalkyl group as a second substituent at a high utilization of the etherifying reagent. An aqueous solution of the resulting mixed cellulose ether exhibits excellent clarity.

While the invention has been described in detail and with reference to specific examples thereof, it will be apparent to one skilled in the art that various changes and modifications can be made therein without departing from the spirit and scope thereof.

What is claimed is:

1. A process for producing a mixed cellulose ether comprising reacting a starting cellulose ether containing an alkyl substituent having a carbon number of from 1 to 3 with an etherifying agent either successively or continuously, wherein said starting cellulose ether comprises at least 18 mol % of a 6-substituted glucose unit and at least 15 mol % of an unsubstituted glucose unit.

2. A process for producing a mixed cellulose ether as claimed in claim 1, wherein said starting cellulose ether comprises from 18 to 50 mol % of a 6-substituted glucose unit and from 15 to 40 mol % of an unsubstituted glucose unit.

3. A process as claimed in claim 1, wherein said starting cellulose ether is a hydroxyalkyl cellulose selected from the group consisting of hydroxyethyl cellulose and hydroxypropyl cellulose.

4. A process as claimed in claim 1, wherein said starting cellulose ether is prepared by mercerization of cellulose in an aqueous phase having an alkali concentration of 25 to 50% by weight for 30 minutes to 4 hours followed by etherification at a temperature of 50° C. or higher for a period of not more than 150 minutes.

5. A process as claimed in claim 4, wherein said mercerization is carried out for 30 minutes to 2 hours.

6. A process as claimed in claim 1, wherein said reacting is carried out in the presence of not more than 0.5 mol of an alkali per mol of glucose unit.

7. A process as claimed in claim 1, wherein the alkyl substituent is selected from the group consisting of a hydroxyalkyl group having a carbon number of from 1 to 3, a carboxy alkyl group having a carbon number of from 1 to 3, an unsubstituted alkyl group having a carbon number of from 1 to 3, and a cationic hydroxyalkyl group having a carbon number of from 1 to 3.

* * * * *